United States Patent
Park

(10) Patent No.: US 9,232,044 B2
(45) Date of Patent: Jan. 5, 2016

(54) MOBILE TERMINAL AND CONTROL METHOD THEREOF

(75) Inventor: Seungyong Park, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 367 days.

(21) Appl. No.: 12/916,037

(22) Filed: Oct. 29, 2010

(65) Prior Publication Data

US 2011/0219334 A1 Sep. 8, 2011

(30) Foreign Application Priority Data

Mar. 3, 2010 (KR) .................. 10-2010-0019057
May 12, 2010 (KR) .................. 10-2010-0044284
May 12, 2010 (KR) .................. 10-2010-0044285

(51) Int. Cl.
*H04M 1/725* (2006.01)
*G06F 3/048* (2013.01)
*G06F 3/0482* (2013.01)
*G06F 3/0488* (2013.01)
*G06F 3/0484* (2013.01)

(52) U.S. Cl.
CPC ......... *H04M 1/72583* (2013.01); *G06F 3/0482* (2013.01); *G06F 3/04842* (2013.01); *G06F 3/04883* (2013.01); *H04M 2250/16* (2013.01); *H04M 2250/22* (2013.01)

(58) Field of Classification Search
CPC . G06F 3/0236; G06F 3/0482; G06F 3/04842; G06F 3/04883; H04M 1/72583; H04M 2250/16; H04M 2250/22
USPC .......................................................... 715/808
See application file for complete search history.

(56) References Cited

U.S. PATENT DOCUMENTS

| | | | | |
|---|---|---|---|---|
| 5,574,843 | A * | 11/1996 | Gerlach, Jr. .................. | 345/418 |
| 7,343,568 | B2 * | 3/2008 | Jiang et al. .................... | 715/854 |
| 7,512,952 | B1 * | 3/2009 | Liu et al. ....................... | 718/108 |
| 7,860,839 | B2 * | 12/2010 | Cisler et al. ................... | 707/654 |
| 7,913,182 | B2 * | 3/2011 | Bear et al. ..................... | 715/778 |
| 8,510,655 | B2 * | 8/2013 | Lee et al. ...................... | 715/723 |
| 2001/0019338 | A1 * | 9/2001 | Roth .............................. | 345/811 |
| 2002/0051014 | A1 * | 5/2002 | Nagasaka et al. ............. | 345/764 |
| 2003/0064757 | A1 * | 4/2003 | Yamadera et al. ............ | 455/566 |
| 2003/0078956 | A1 * | 4/2003 | Ravichandran et al. ...... | 709/107 |
| 2007/0050722 | A1 * | 3/2007 | Schulz et al. ................. | 715/764 |
| 2008/0016169 | A1 * | 1/2008 | Kaghazian .................... | 709/206 |

(Continued)

OTHER PUBLICATIONS

CodeProject (A software development and discussion community for sharing source code) article written Feb. 28, 2004 retrieved from http://codeproject.com retrieved on Jan. 28, 2013.*

*Primary Examiner* — Amy M Levy
(74) *Attorney, Agent, or Firm* — Birch, Stewart, Kolasch & Birch, LLP

(57) ABSTRACT

A mobile terminal and a control method thereof are provided. The method according to an embodiment includes displaying, on a screen of a display unit of the mobile terminal, a first image including a plurality of items; receiving a selection of at least one item among the plurality of the displayed items; indicating, on the first image, the at least one selected item as selected; while the at least one selected item is indicated as selected, when an event of changing the displayed first image to a second image occurs, executing an application for processing the event, the event being initiated by the mobile terminal; and after the application is executed, re-displaying, on the screen, the first image having one or more of the at least one selected item as still selected.

13 Claims, 16 Drawing Sheets

(56) References Cited

U.S. PATENT DOCUMENTS

| | | |
|---|---|---|
| 2010/0011310 A1* | 1/2010 | Rainisto .................. 715/769 |
| 2010/0070899 A1* | 3/2010 | Hunt et al. .................. 715/769 |
| 2010/0106864 A1* | 4/2010 | Li et al. .................. 710/17 |
| 2010/0157989 A1* | 6/2010 | Krzyzanowski et al. ..... 370/352 |
| 2010/0241994 A1* | 9/2010 | Wiley et al. .................. 715/832 |
| 2010/0333006 A1* | 12/2010 | Ostergard et al. ............ 715/768 |
| 2011/0016417 A1* | 1/2011 | Shiplacoff et al. ............ 715/768 |
| 2011/0175748 A1* | 7/2011 | Small et al. .............. 340/815.55 |
| 2012/0017175 A1* | 1/2012 | Duquene et al. .............. 715/823 |

\* cited by examiner

FIG. 9

FIG. 10
(a)
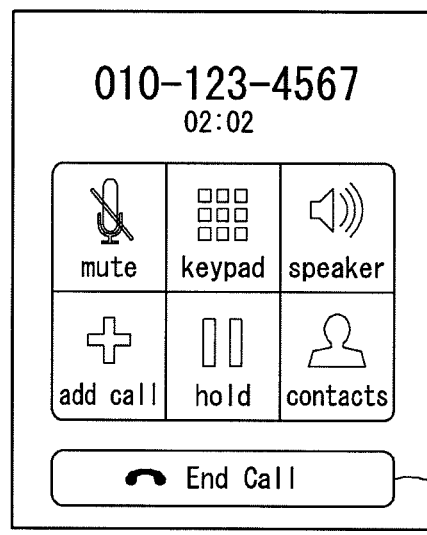
(b)
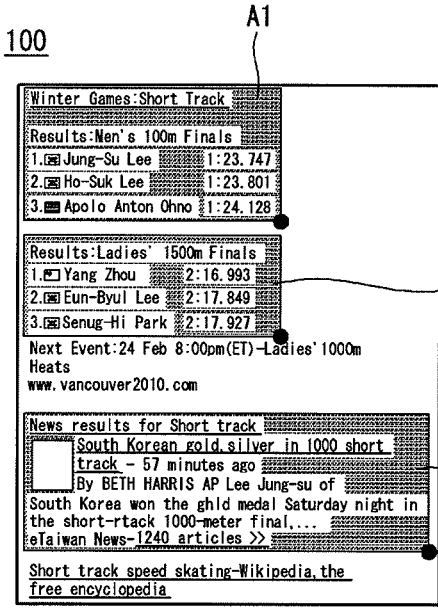
(c)
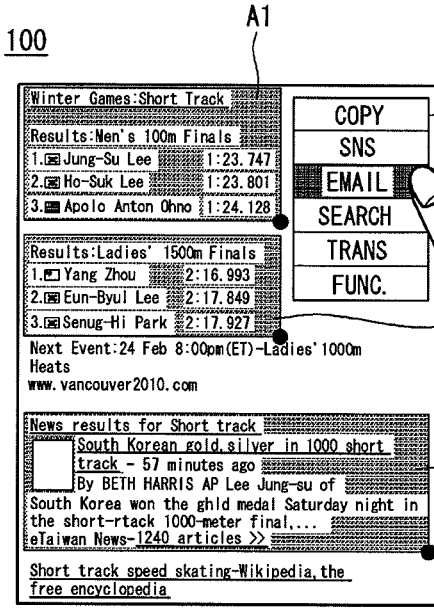
(d)

FIG. 12
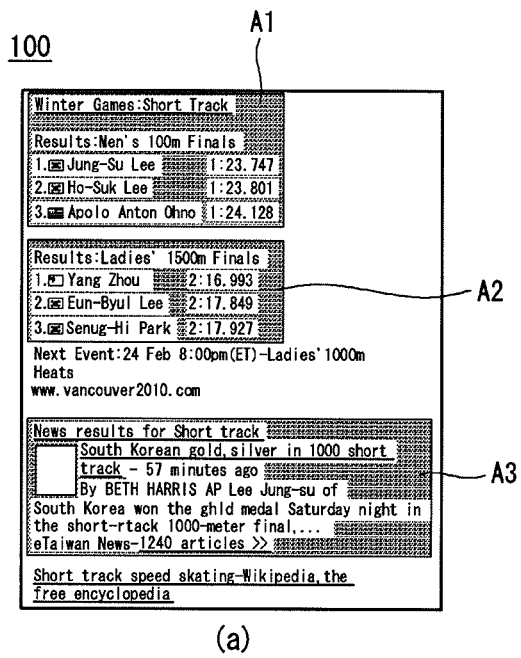
(a)
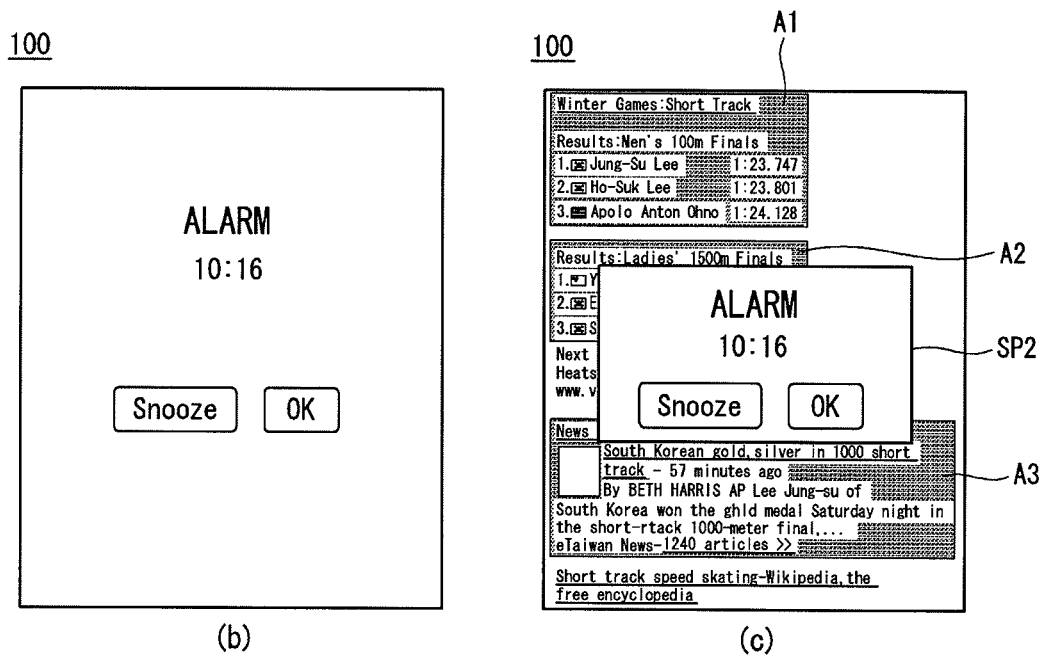
(b)                    (c)

FIG. 14
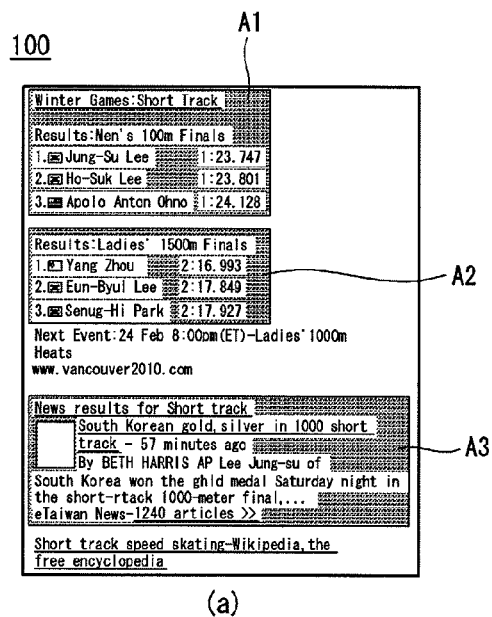
(a)
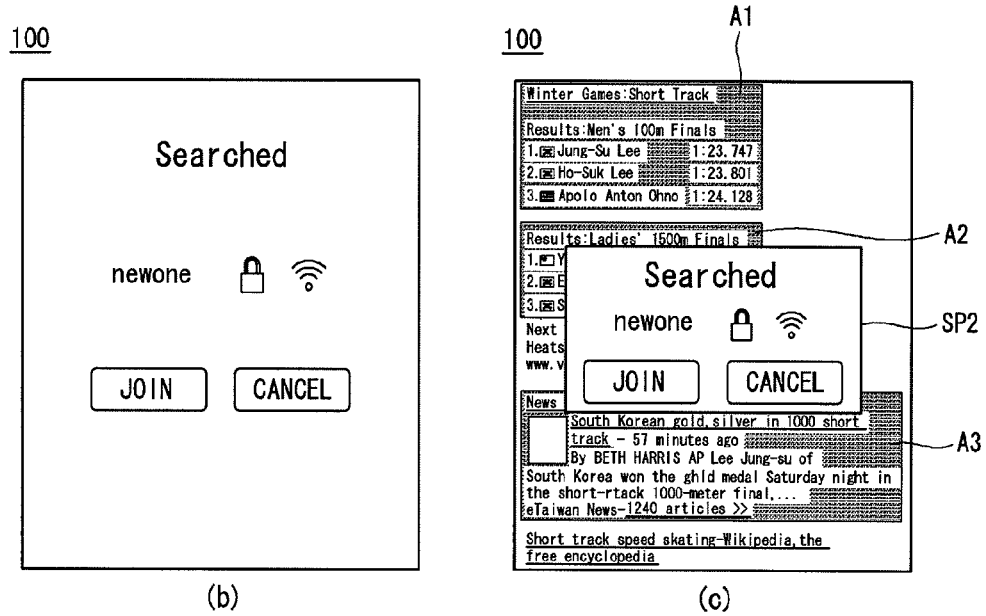
(b)     (c)

MOBILE TERMINAL AND CONTROL METHOD THEREOF

This application claims the priority benefits of Korean Patent Application No. 10-2010-0019057 filed on Mar. 3, 2010, Korean Patent Application No. 10-2010-0044284 filed on May 12, 2010, and Korean Patent Application No. 10-2010-0044285 filed on May 12, 2010, all of which are hereby incorporated by reference.

BACKGROUND

1. Field of the Invention

This document relates to a mobile terminal and a control method thereof and, more particularly, to a mobile terminal and a control method thereof for maintaining the selection of an image even when a specific event is generated while the item is being selected.

2. Discussion of the Related Art

As functions of terminals such as personal computers, laptop computers, cellular phones and the like are diversified, the terminals are constructed in the form of a multimedia player having multiple functions of capturing pictures or moving images, playing music, moving image files and games and receiving broadcasting programs.

Terminals can be divided into mobile terminals and stationary terminals. The mobile terminals can be classified into handheld terminals and vehicle mount terminals according to whether the users can personally carry the terminals.

To support and enhance the functions of a terminal, a structural part and/or a software part of the terminal may be enhanced. As a variety of terminals including the mobile terminals provide complicated and various functions, a menu structure becomes also complicated. Furthermore, a function of displaying digital documents including web pages is added to the functions of the mobile terminals.

SUMMARY

An aspect of the invention is to provide a mobile terminal and a control method thereof for maintaining the selection of an image even when a specific event is generated while the item is being selected.

It is another object of the present invention to provide a terminal and its control method where during an item selecting process, if a screen image changing event occurs due to a mobile terminal-initiated operation, then the item selected thus far is maintained even after the screen image changing event occurs.

It is another object of the present invention to provide a terminal and method for controlling a user's selection on a screen of the mobile, which address the limitations and disadvantages associated with the related art.

According to an embodiment, the invention provides a method of controlling a mobile terminal including a display unit, the method including: displaying, on a screen of the display unit, a first image including a plurality of items; receiving a selection of at least one item among the plurality of the displayed items; indicating, on the first image, the at least one selected item as selected; while the at least one selected item is indicated as selected, when an event of changing the displayed first image to a second image occurs, executing an application for processing the event, the event being initiated by the mobile terminal; and after the application is executed, re-displaying, on the screen, the first image having one or more of the at least one selected item as still selected.

According to an embodiment, the invention provides a mobile terminal including: a display unit including a screen; and a controller configured to control the display unit, and configured to: display, on the screen, a first image including a plurality of items; receive a selection of at least one item among the plurality of the displayed items; indicate, on the first image, the at least one selected item as selected; while the at least one selected item is indicated as selected, when an event of changing the displayed first image to a second image occurs, execute an application for processing the event, the event being initiated by the mobile terminal; and after the application is executed, re-display, on the screen, the first image having one or more of the at least one selected item as still selected.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The accompany drawings, which are included to provide a further understanding of the invention and are incorporated on and constitute a part of this specification illustrate embodiments of the invention and together with the description serve to explain the principles of the invention.

Figure 9:
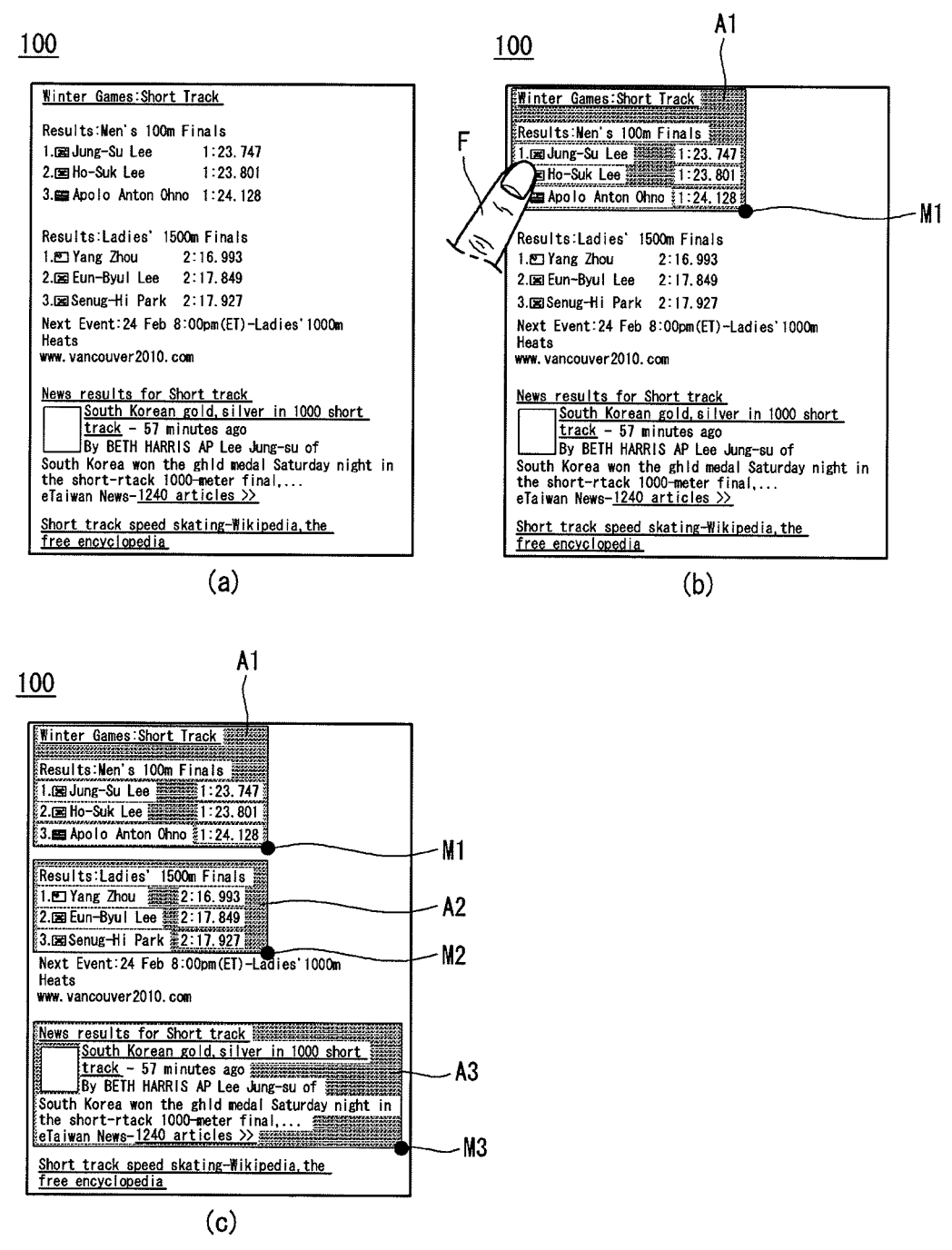

FIGS. 9(a)-11(d) illustrate examples of an operation of the mobile terminal shown in FIG. 5;

FIGS. 12(a)-13(b) illustrate another example of an operation of the mobile terminal shown in FIG. 5;

FIGS. 14(a)-15(b) illustrate another example of an operation of the mobile terminal shown in FIG. 5.

DETAILED DESCRIPTION OF PREFERRED EMBODIMENTS

Embodiments of the present invention will now be described more fully with reference to the accompanying drawings, in which exemplary embodiments of the invention are shown. The embodiments of the invention may, however, be embodied in many different forms and should not be construed as being limited to the embodiments set forth herein; rather, there embodiments are provided so that this disclosure will be thorough and complete, and will fully convey the concept of the invention to those skilled in the art.

Hereinafter, a mobile terminal relating to various embodiments of the present invention will be described below in more detail with reference to the accompanying drawings. In the following description, suffixes "module" and "unit" are given to components of the mobile terminal in consideration of only facilitation of description and do not have meanings or functions discriminated from each other.

The mobile terminal described in the specification can include, but is not limited to, a cellular phone, a smart phone, a laptop computer, a digital broadcasting terminal, personal digital assistants (PDA), a portable multimedia player (PMP), a portable TV device, a navigation system and so on.

However, those skilled in the art will easily understand that configurations according to embodiments of the present invention can also be applied to stationary terminals such as digital TV and desktop computers except a case where the configurations can be applied to only mobile terminals.

Figure 1:
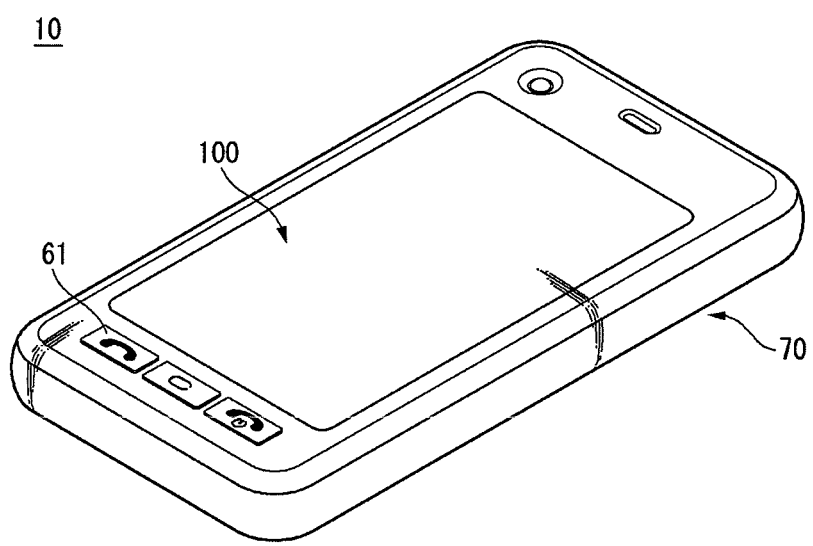
FIG. 1 is a perspective view of a mobile terminal according to an embodiment of the present invention.

FIG. 1 is a perspective view of a mobile terminal 10 according to an embodiment of the present invention.

Referring to FIG. 1, the mobile terminal 10 according to an embodiment of the present invention may include a body 70 and a touch screen 100 attached to one side of the body 70.

The body 70 may form the external appearance of the mobile terminal 10 and protect internal components of the mobile terminal 10 from impact applied to the mobile terminal 10. The body 70 may be formed of a plastic material including engineering plastics or metal including steel to effectively absorb impact, or a combination thereof. The body 70 may be formed from a single molded piece or formed by assembling multiple molded pieces. The body 70 may include various buttons 61, and may include components that are commonly known in mobile terminals.

The buttons 61 may be appropriately disposed on the front face, side and rear face of the body 70 according to design needs. The number of buttons 61 may be adjusted according to design needs. As a variation, the body 70 may not have any physical button.

The touch screen 100 may be attached to at least one side of the body 70. For example, the touch screen 100 may be attached to the front side or the backside of the body 70. As a variation, the touch screen 100 may be attached to both the front side and the backside of the body 70. Moreover, the touch screen 100 may be transparent such that an object behind the mobile terminal 10 can be seen through the touch screen 100. Though the term 'touch screen' is used since the touch screen 100 displays images and receives touch inputs, the touch screen may be referred to as a display. The mobile terminal 10 can further include known components such as an audio output, a controller/processor, a memory, a camera, etc.

Figure 2:
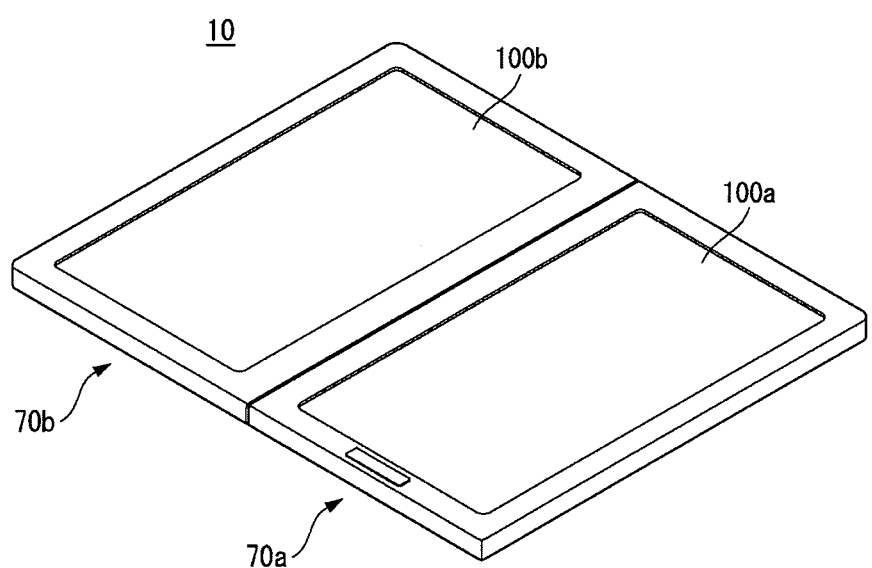
FIG. 2 is a perspective view of a mobile terminal according to another embodiment of the present invention.

FIG. 2 is a perspective view of a mobile terminal according to another embodiment of the present invention.

Referring to FIG. 2, the mobile terminal 10 according to this embodiment of the present invention may include first and second touch screens 100a and 100b respectively mounted in first and second bodies 70a and 70b.

The first and second bodies 70a and 70b may be respectively formed and assembled. For example, the first and second bodies 70a and 70b may be respectively formed in a hexahedral shape. The first and second bodies 70a and 70b may rotate on a hinge to be in a closed status or an open status. The first and second bodies 70a and 70b are folded in the closed status and unfolded and arranged in parallel with each other in the open status. In the open status, a user can view images displayed on a wider screen because the first and second bodies 70a and 70b are unfolded. The mobile terminal 10 of FIG. 2 may also include known components such as an audio output, a controller/processor, a memory, a camera, etc.

Figure 3:
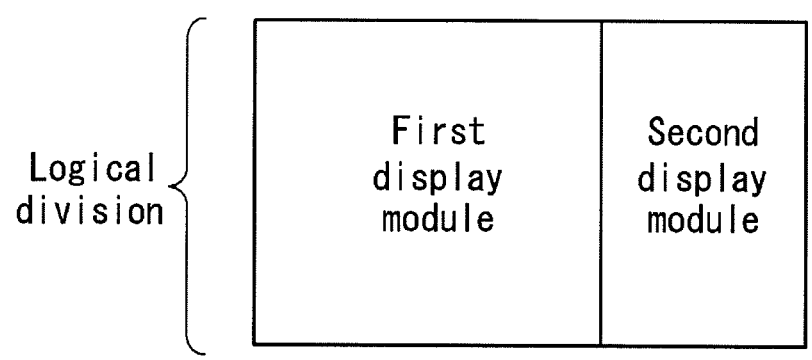
FIG. 3 is a view for explaining an example of a logical division of a display of a mobile terminal according to an embodiment of the invention.

FIG. 3 is a view for explaining an example of a logical division of a display usable in the mobile terminal of the invention.

Referring to FIG. 3, a touch screen (e.g., the touch screen 100, 70a, or 70b) may be divided into a plurality of regions in a single display panel. For example, the touch screen can function as multiple touch screens (multiple display modules) logically although the touch screen is in a single body physically. When the touch screen is divided into a plurality of regions, different images can be respectively displayed on the plurality of regions. Furthermore, a touch input applied to one of the plurality of regions can be distinguished from a touch input applied to another region among the regions of the touch screen. The terminal in which the touch screen is disposed can selectively and independently control images displayed in each of the regions of the touch screen.

Figure 4:
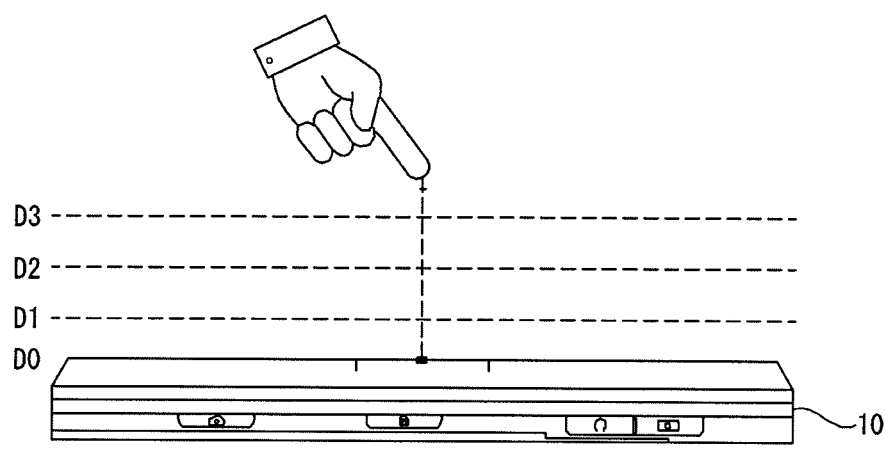
FIG. 4 is a view for explaining an example of a proximity depth of a proximity sensor of a mobile terminal according to an embodiment of the invention.

FIG. 4 is a view for explaining a proximity depth of a proximity sensor which can be used in the mobile terminal of the invention.

As shown in FIG. 4, the proximity sensor may be disposed in an internal region of the mobile terminal 10, which is surrounded by a touch screen, or near the touch screen. The proximity sensor senses a presence or absence of an object approaching a predetermined sensing face or an object disposed in proximity to the sensing face using electromagnetic force or infrared rays without having a direct mechanical contact. The proximity sensor preferably has a lifetime that is longer than that of a contact sensor and is used for a wide range of applications.

Examples of the proximity sensor include a transmitting photoelectric sensor, a direct reflex photoelectric sensor, a mirror reflective photoelectric sensor, a high-frequency oscillating proximity sensor, a capacitance type proximity sensor, a magnetic proximity sensor, an infrared proximity sensor and so on.

In the case of a capacitive touch screen, the proximity sensor is constructed such that it senses proximity of a pointer according to a variation in electric field due to the proximity of the pointer. In this case, the touch screen (touch sensor) may be classified as a proximity sensor.

For convenience of explanation, an action of moving the pointer towards the touch screen while the pointer is not being in contact with the touch screen such that the location of the pointer on the touch screen is recognized, is referred to as "proximity touch" and an action of bringing the pointer into contact with the touch screen is referred to as "contact touch" in the following description. A proximity touch point of the pointer on the touch screen preferably means a point of the touch screen to which the pointer corresponds perpendicularly to the touch screen when the pointer proximity-touches the touch screen.

The proximity sensor senses a proximity touch and a proximity touch pattern (for example, a proximity touch distance, a proximity touch direction, a proximity touch velocity, a proximity touch time, a proximity touch position, a proximity touch moving state, etc.). Information corresponding to the sensed proximity touch action and proximity touch pattern can be processed by the mobile terminal and displayed on the touch screen of the mobile terminal.

Figure 5:
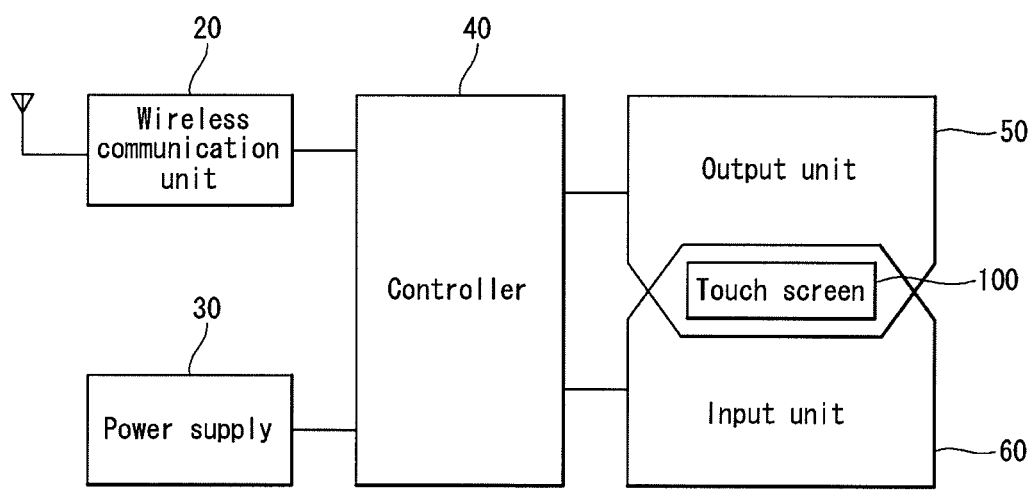
FIG. 5 is a block diagram of the mobile terminal according to an embodiment of the present invention.

FIG. 5 is a block diagram of the mobile terminal 10 according to an embodiment of the present invention. The mobile terminal 10 of FIG. 5 can be any mobile terminal discussed herein including the mobile terminal of FIGS. 1-4.

Referring to FIG. 5, the mobile terminal 10 according to an embodiment of the present invention may include a wireless communication unit 20, an input unit 60, an output unit 50, a controller 40, a power supply 30 and a touch screen 100. The mobile terminal 10 also includes additional components which may be known such as a storage unit, an audio unit, etc. All components of the mobile terminal 10 according to various embodiments are operatively coupled and configured.

The wireless communication unit 20 may include at least one module for enabling wireless communication between the mobile terminal 10 and a wireless communication system or wireless communication between the mobile terminal 10 and a network in which the mobile terminal 10 is located. For example, the wireless communication unit 20 may include one or more of a broadcast receiving module, a mobile communication module, a wireless Internet module, a local area communication module and a position information module.

The input unit 60 receives input data for controlling the operation of the mobile terminal 10, input by a user. The input unit 60 may be implemented using one or more of a key pad, a dome switch, a jog wheel or a jog switch as well as a constant voltage type touch pad or a capacitive touch pad.

The output unit 50 generates visual, auditory and/or tactile outputs. The output unit 50 may include an audio output module, an alarm and a reaction module in addition to the touch screen 100.

The controller 40 controls the overall operation of the mobile terminal 10. For example, the controller 40 may perform control and processing with respect to voice communication, data communication and video communication. The controller 40 may include a multimedia module for multimedia reproduction. Furthermore, the controller 40 may carry out pattern recognition for respectively recognizing handwriting inputs and drawing inputs applied to the touch screen as characters and images.

The power supply 30 receives external power and internal power under the control of the controller 40 and provides power to the components of the mobile terminal 10 to operate.

The touch screen 100 may be mounted in the front side of the body (e.g., the body 70 shown in FIG. 1). The touch screen 100 may display information and other data. Furthermore, the touch screen 100 may display information such that a user can select specific information. The touch screen 100 may be constructed by assembling a display panel and a touch panel. For example, the touch screen 100 can be constructed in such a manner that a touch panel capable of receiving touch inputs is mounted on a display panel composed of, e.g., LCD or OLED. Furthermore, the display panel and the touch panel may be integrated to produce the touch screen 100. Resistant, capacitive, infrared and ultrasonic touch panels can be used for the touch screen. Among these touch panels, the capacitive touch panel senses a variation in the capacitance between conductive layers included in the touch panel to recognize a touch input. The capacitive touch panel may include two conductive layers, an insulating substrate and a passivation layer, which is not shown in the drawings. Furthermore, the capacitive touch panel may further include a shield layer for improving a signal-to-noise ratio. The touch screen 100 may be the output unit 50 and the input unit 60 because the touch screen 100 includes the display panel displaying images and the touch panel receiving touch inputs.

Figure 6:
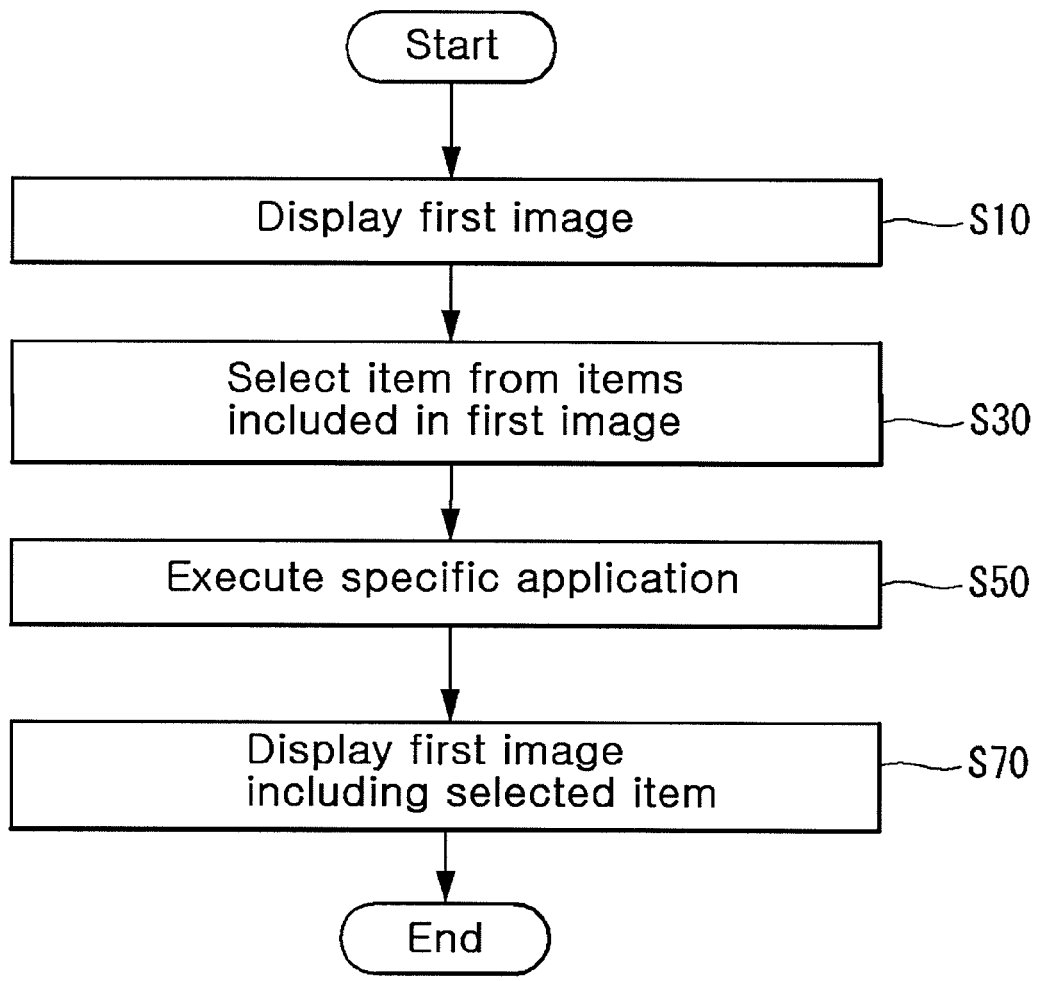
FIG. 6 is a flowchart showing an operation of the mobile terminal shown in FIG. 5 according to an embodiment of the present invention.

FIG. 6 is a flowchart showing an operation of the mobile terminal shown in FIG. 5 or in other figures.

Referring to FIGS. 5 and 6 as an example, the controller 40 of the mobile terminal 10 may include an operation S10 of displaying a first image on a screen (e.g., touch screen 100) of the mobile terminal 100. The first image displayed may include various contents/data that can be output through the touch screen 100 of the mobile terminal 10. For example, the displayed first image may include a web page, a picture file list or thumbnail, a music file list, an e-mail list, an SMS or MMS message list, various documents, etc. That is, visually recognizable information can be displayed on the touch screen 100.

When the first image is displayed, an operation S30 of selecting an item displayed on the first image may be executed. The item preferably displayed on or as part of the first image may be a selectable object/item. If the first image corresponds to a web page, then for example, words, texts, pictures, moving pictures, links, etc. included in the web page may be items. If the first image corresponds to an e-mail list, then each e-mail may be an item. The first image may include a plurality of items. For example, a web page may include multiple texts, multiple pictures or multiple links, each or some of which can be an item that can be selected by a user. The controller 40 of the mobile terminal 10 allows the user to select one or more of these plurality of items displayed on the screen.

An operation S50 of executing one or more specific applications may be performed while or after one of the item(s) included in the first image is selected. The specific application may be a program or a process for carrying out a function of the mobile terminal 10. For example, a call request may be received through a mobile communication module included in the wireless communication unit 20 of the mobile terminal 10 while the user is selecting (or has begun to select) item(s) by touching the item(s) included in the displayed first image. At this time, if the call request is received, the user's process of selecting the items of the first image is interrupted, and the controller 40 may load a call application capable of processing the call request from a memory of the mobile terminal and execute the call application. When the call application is executed, the user is notified that the call request is received and the call corresponding to the call request may be connected to the user. When the call request is received or the call is connected, the display of the touch screen 100 may be changed. For example, the first image displaying the selectable items may be changed into a call receiving image accompanied by a sound or vibration that informs the user that a call is being received. When an event of executing the specific application is ended or interrupted, execution of the specific application may be ended or interrupted.

When the execution of the specific application is completed (or interrupted), e.g., the user has completed the phone call, then an operation S70 of re-displaying the first image on which the item(s) are selected (or have been selected) is carried out. For example, when the specific application is executed, an image corresponding to the executed application may be displayed on the screen of the mobile terminal (e.g., during the operation S50), as described above. Accordingly, the whole first image or a part of the first image may not be displayed while the image corresponding to the application being executed is being displayed. If the execution of the specific application is completed or stopped, and thus displaying the image corresponding to the application is no longer needed (or cancelled), then the first image is preferably re-displayed on the screen of the mobile terminal. At this point, according to the embodiment of the present invention, the re-displayed first image displays those items (or contents) already selected by the user up until the execution of the specific application started (or another application is executed). For instance, if the user selected an item A during the item selecting process, and during this process, an event initiated by the mobile terminal (without any direct user input) such as receiving a phone call occurs which interrupts the item selecting process. Then after the phone call has ended, the screen re-displays the first image having the item A as being already selected. As a result, the first image is re-displayed with the user's selections still maintained. Thus it is possible to mitigate the inconvenience of having to re-select the item A on the re-displayed first image even after a specific event (e.g., phone call) is abruptly generated to execute another function.

Figure 7:
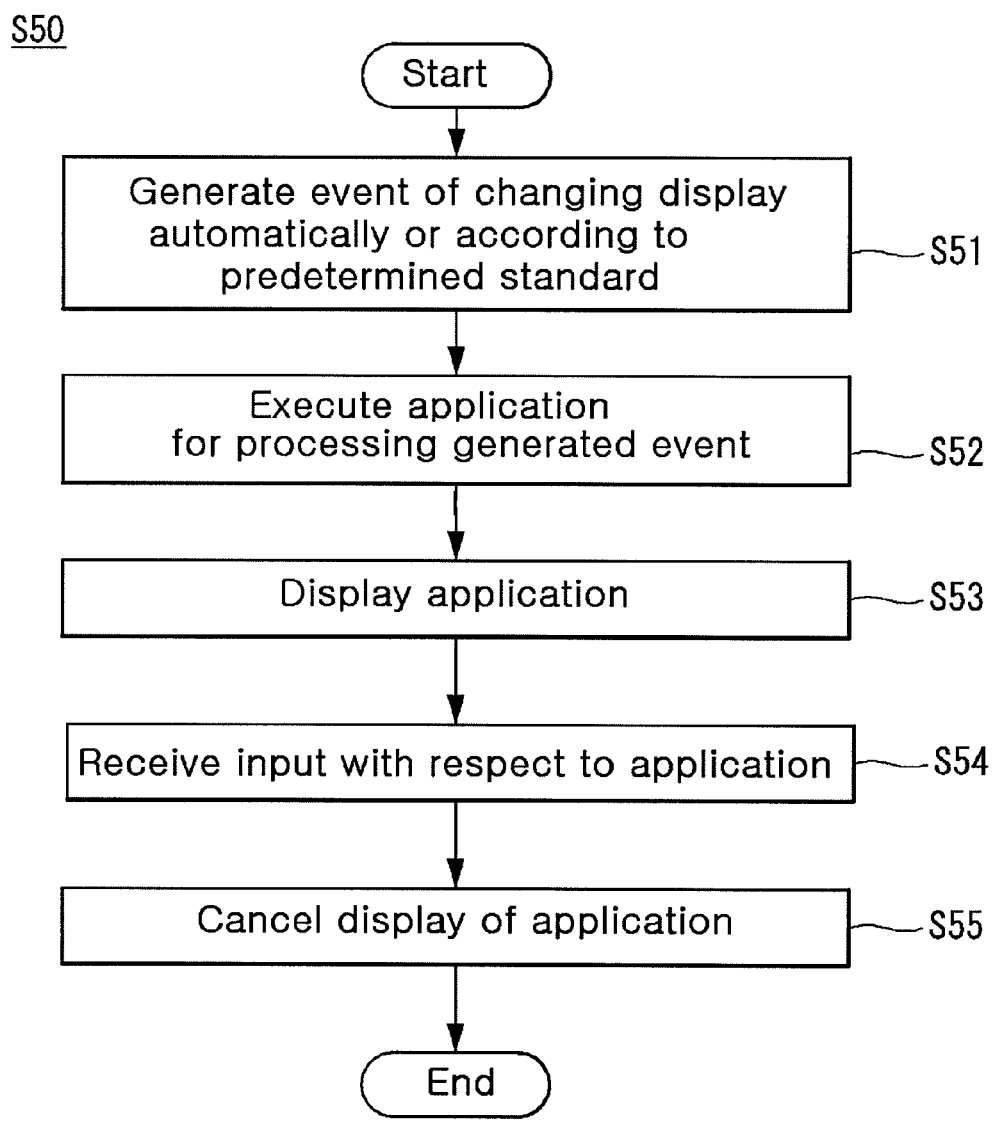
FIG. 7 is a flowchart showing an operation of executing a specific application, shown in FIG. 6, in more detail according to an embodiment of the present invention.

FIG. 7 is a flowchart showing an example of the operation S50 of executing the specific application, shown in FIG. 6.

Referring to FIG. 7, the operation S50 of executing the specific application may include an operation S51 of generating an event of changing the display automatically or according to a predetermined standard. For instance, the event or operation in the embodiments of the invention, which causes the previously selected items to be maintained, is an event or operation that is initiated by the mobile terminal itself (e.g., an event that occurs at the mobile terminal without the user's direct input), which causes the screen image to be changed. An example of such an event is the mobile terminal receiving a call which is initiated by the mobile terminal and occurs naturally.

Specifically, the event of changing the display is generated when the display of the touch screen 100 shown in FIG. 5 is automatically changed to cope with a received external signal or a when the display of the touch screen 100 is changed since the current state satisfies a predetermined specific standard.

As mentioned, the case that the display of the touch screen 100 is automatically changed may include a case when a call request is received by the mobile terminal, for example. When the call request is received, the call request is automatically displayed on the touch screen 100 irrespective of the intention of the user of the mobile terminal 10 or without any direct input by the user of the mobile terminal 10.

In another example, the case that the current state satisfies the predetermined specific standard may include a case where an alarm requirement is satisfied, for example. On a specific time previously set through an alarm function, the touch screen 100 may alert the user and display information representing the set time irrespective of the current intention of the user of the mobile terminal 10 or without any current input by the user of the mobile terminal 10.

The event may include a situation in which the display of the touch screen 100 is required to change automatically or according to the predetermined standard. For example, the event may correspond to the generation of an interrupt according to the automatically or previously set standard. The interrupt may correspond to an abrupt signal generated irrespective of the operation flow of the mobile terminal.

When the event of changing the display of the touch screen 100 automatically or according to the predetermined standard is generated (e.g., when the event that is initiated by the mobile terminal, which requires the screen image to be changed), the controller 40 may execute an application for processing the generated event in an operation S52 and display the executed application on the touch screen 100 shown in FIG. 5 in an operation S53.

When the event is generated, the controller 40 shown in FIG. 5 may load the specific application from a storage unit to a memory of the mobile terminal and execute the specific application. Otherwise, the controller 40 shown in FIG. 5 may load the specific application stored in a storage region of the memory to an activation region of the memory. Furthermore, the controller 40 shown in FIG. 5 may activate the specific application that has been loaded but inactivated.

The application executed by the controller 40 may be displayed on the touch screen 100 to represent the generation of the event or the execution of the application for processing the event. The application may be displayed on the whole area or a specific part of the touch screen 100. Accordingly, the user can visually recognize that the specific event is generated When or after the application is displayed on the screen of the mobile terminal in the operation S53, an operation S54 of receiving an input with respect to the application may be performed.

An appropriate user input with respect to the executed and displayed application may be received by the mobile terminal. For example, if the executed application corresponds to a call-related application, an input with respect to the connection or refusal of a call may be received. If the executed application corresponds to an alarm-related application, an input with respect to stopping or postponing alarm may be received. Furthermore, the input with respect to the application may be a control signal of the controller 40. For example, if a specific input from the user is not received even after the alarm is generated for a predetermined time, the controller 40 may apply a control signal for stopping the alarm to the application without the user input. When the application receives a specific input for any function offered by the application, the application may execute a specific function corresponding to the received input.

When the input with respect to the application is received in the operation S54, an operation S55 of canceling the display of the application may be carried out. For example, if a specific input for ending the execution of the application is received, the execution of the application may be ended. When the execution of the application is ended, the display of the application may be cancelled and the application is no longer displayed on the screen of the mobile terminal. For example, the display of the application on the whole area or a specific part of the touch screen 100 shown in FIG. 5 disappears. Then, the operation S70 shown in FIG. 6, which displays the first image for allowing the user to select an item, may be performed by the controller 40 shown in FIG. 5. The item(s) previously selected by the user, before the application is executed (before the mobile terminal-initiated event is processed), would be maintained and shown as still selected on the screen, even after the execution of the application is completed or ended or interrupted.

Figure 8:
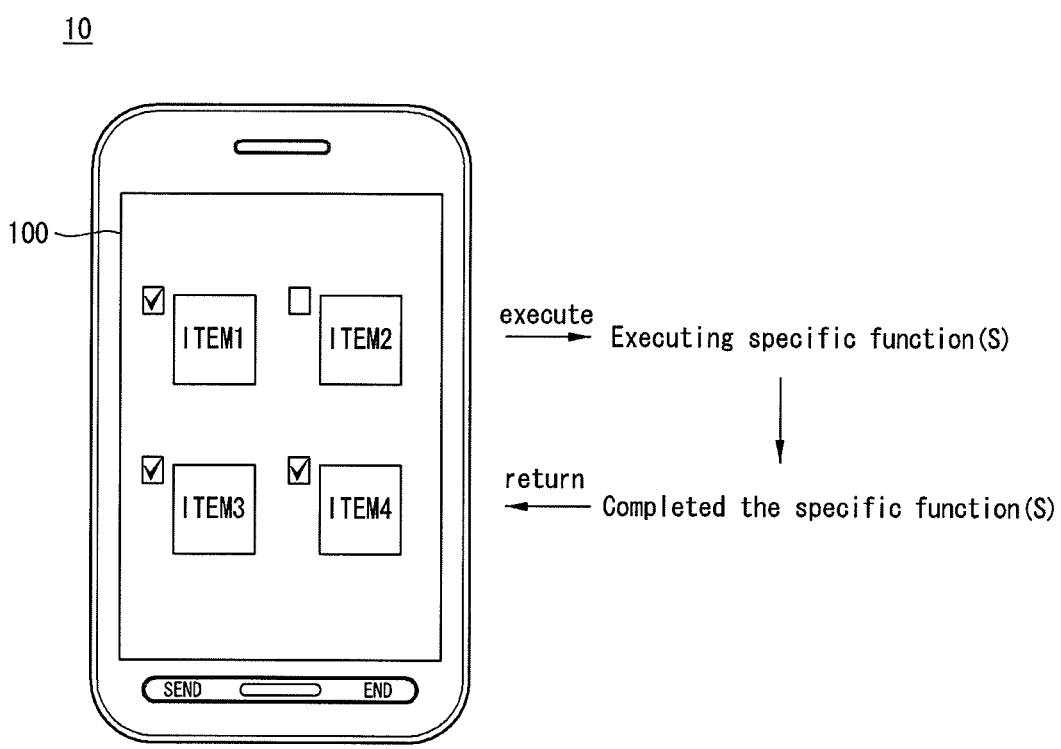
FIG. 8 is a view for explaining an example of an operation of the mobile terminal shown in FIG. 5.

FIG. 8 is a view for explaining an example of an operation of the mobile terminal 10 shown in FIG. 5.

Referring to FIGS. 5 and 8, first, second, third and fourth items ITEM1, ITEM2, ITEM3 and ITEM4, which are selectable by the user, may be displayed on the touch screen 100 of the mobile terminal 10. The first, second, third and fourth items ITEM1, ITEM2, ITEM3 and ITEM4 may be, for example, picture files, texts or the like.

The user may select specific item(s) from the first, second, third and fourth items ITEM1, ITEM2, ITEM3 and ITEM4 displayed on the screen of the mobile terminal. For example, the user may select the first, third and fourth items ITEM1, ITEM3 and ITEM4 as shown. Furthermore, the user may select specific function(s) corresponding to the selected item(s). For instance, the user may select a function of copying the selected ITEM1, ITEM3 and ITEM4 into a file, which may occur using pop-up windows or other menus.

When the specific function(s) selected by the user are executed and the executed functions are terminated or completed, the initial image displaying the first, second, third and fourth items ITEM1, ITEM2, ITEM3 and ITEM4 may be re-displayed on the screen of the mobile terminal. Here, according to the invention, the selection of the first, third and fourth items ITEM1, ITEM3 and ITEM4 is maintained and shown as still selected on the screen even after the specific function selected by the user has been completed. Accordingly, there is no need for the user to re-select these items again if the user wants to execute another function on these items, e.g., a function of emailing these items. As a result, since the invention maintains the user's selections even after functions for the selected items are completed, multiple functions for the same selected items can be made without having to reselect the items multiple times, which is convenient for the user and saves operation time.

FIGS. 9(a)-11(d) illustrate an exemplary operation of the mobile terminal shown in FIG. 5. In this example, even when a call receiving event (event initiated by the mobile terminal) is generated while items displayed on the touch screen 100 are being selected by the user, the mobile terminal 10 shown in FIG. 5 can maintain the selection of items when the call receiving event is ended. Accordingly, it is possible to mitigate the inconvenience that the user has to repeatedly select the same items when an event interrupts the item selection process or when an event occurs after the item(s) have been selected.

Referring to FIG. 9(a), a web page may be displayed on the touch screen 100 of the mobile terminal. Information may be displayed on the web page in various manners. For example, information may be displayed in the form of a text or a picture. Furthermore, information displayed in the form of a text may include a simple text, a linked text, etc.

Referring to FIG. 9(b), the user may select a desired item among the displayed items by using a finger F. For example, the user may select a first area A1 to choose a text item included in the first area A1. The user may select the text item by touching a specific point on the touch screen 100. For instance, when the user touches the specific point, a text within a predetermined range from the specific point may be selected. For example, if the center of the first area A1 is touched for longer than a predetermined time, one paragraph having the touched point at the center may be selected. Furthermore, the user may select the text item by drawing a closed curve with his/her finger. For instance, when the user draws the closed curve with his/her finger, a text included in the closed curve is selected. The invention encompasses various ways to select an item or region on the displayed screen.

When the specific item is selected by a touch operation of the user (or some other manner), the selected item may be displayed or marked such that the selected item is distinguished from unselected items. For example, hatching may be performed on the selected item or a line surrounding the selected item may be displayed to indicate that the item has been selected. In another example, a first marker M1 may be displayed to represent that the selection of the item is maintained. When the first marker M1 is displayed, the user can intuitively recognize that the selection of the item is maintained even after a specific function is executed, and then the touch screen 100 is returned to the initial display state.

Referring to FIG. 9(c), the user may select multiple items. For example, the user may select the first area A1 to choose a text item included therein, select a second area A2 to choose a text item included therein and select a third area A3 to choose text and picture items included therein. Furthermore, the controller 40 shown in FIG. 5 may respectively display first, second and third markers M1, M2 and M3 on or adjacent the selected first, second and third areas A1, A2 and A3 to represent that the selection of the items included in the first, second and third areas A1, A2 and A3 is and will be maintained.

During this time, a call may be received by the mobile terminal which is an example of an event initiated by the mobile terminal, which requires the screen to be changed to a new image displaying a call receiving notice on the touch screen 100 as shown in FIG. 10(a). The display of the call receiving notice on the touch screen 100 represents that a call-related application is executed. That is, the display of the call receiving notice preferably means that the call-related application has been loaded or activated before the image showing that the call receiving notice is displayed on the touch screen 100. When the call-related application is loaded or the inactivated call-related application is activated to the display the call receiving notice, the display of the image for selecting items, as shown in FIGS. 9(a), 9(b) and 9(c), may be cancelled or may disappear temporarily. Here, the controller 40 shown in FIG. 5 may store information about the display state and selected items shown in FIG. 9(c) in a memory of the mobile terminal before the display of the image for selecting items disappears.

Referring to FIG. 10(b), the user may answer the call corresponding to the call receiving notice according to an input from the user. The call may be a voice call or a video call. When the user wants to end the call, the user may touch a first input window SP1. When the user touches the first input window SP1, the call is ended and the application loaded or activated for processing the call is unloaded or terminated or deactivated. For example, the call application may be completely terminated or foreground execution of the call application may be changed to the background execution. When the call is ended and the call application is unloaded, inactivated or terminated, the image being displayed before the call application is executed is displayed again.

For instance, referring to FIG. 10(c), the image being displayed before the call application is executed (e.g., image of FIG. 9(c)) is re-displayed on the touch screen 100. At this time, the contents, which are selected by the user and displayed before the call application is executed to display a call-related image, are displayed on the touch screen 100. That is, the first, second and third areas A1, A2 and A3 are displayed on the touch screen 100. And the contents previously selected by the user (before the call application is executed) are re-displayed as still being selected, irrespective of whether the call application is executed. As such, the user does not need to re-select the same areas A1, A2 and A3 due to the call, and thus it is possible to mitigate the inconvenience that the user has to repeatedly select the same items to carry out various operations.

Since the items still remain selected, referring to FIG. 10(d), specific functions to be applied to the selected items may be selected by the user. The specific functions which can be performed with respect to the selected items may be displayed as a pop-up window P. The user may select desired function(s) from the specific functions displayed in the pop-up window P. For example, the user may select a function of affixing the contents of the selected first area A1 to an e-mail as shown in FIG. 10(d). The functions displayed in the pop-up window P may correspond to functions related to the selected items. That is, functions that can be applied to the selected items may be displayed in consideration of the attributes of the selected items. If a text item is selected, for example, functions of copying the selected text item, sending the selected text item to a social network service (SNS), searching for information on the text item and translating the text item may be displayed. The user may select a desired function from the displayed functions and execute the selected function. The functions displayed in the pop-up window P may vary according to the attributes of the selected items. The functions may include a translating function if a text item is selected, and may include an image editing function if a picture item is selected. The number of times that a specific function can be selected for a selected item may correspond to the number of items selected by the user. For example, one or more specific functions may be selected for each of selected items.

Figure 11:
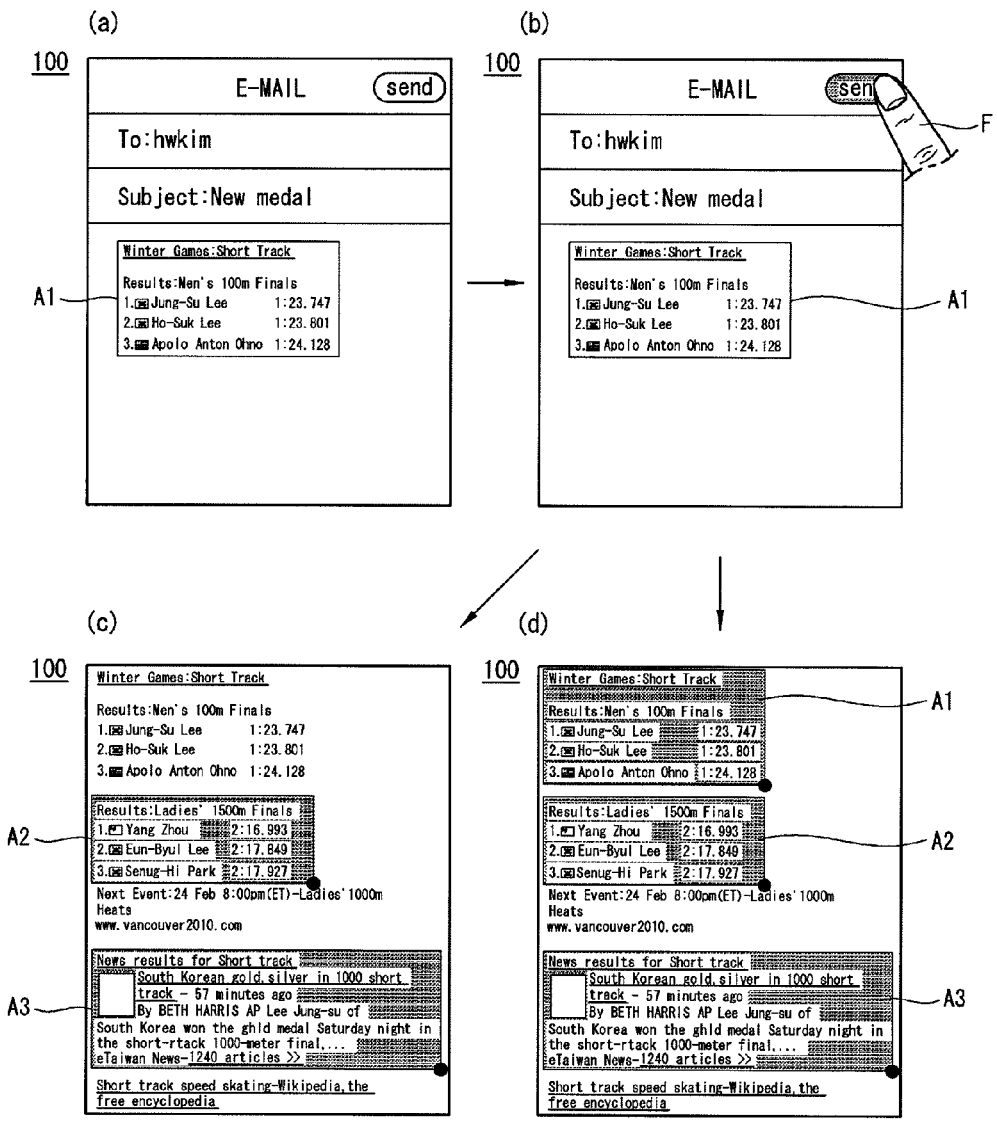
Figure 13:
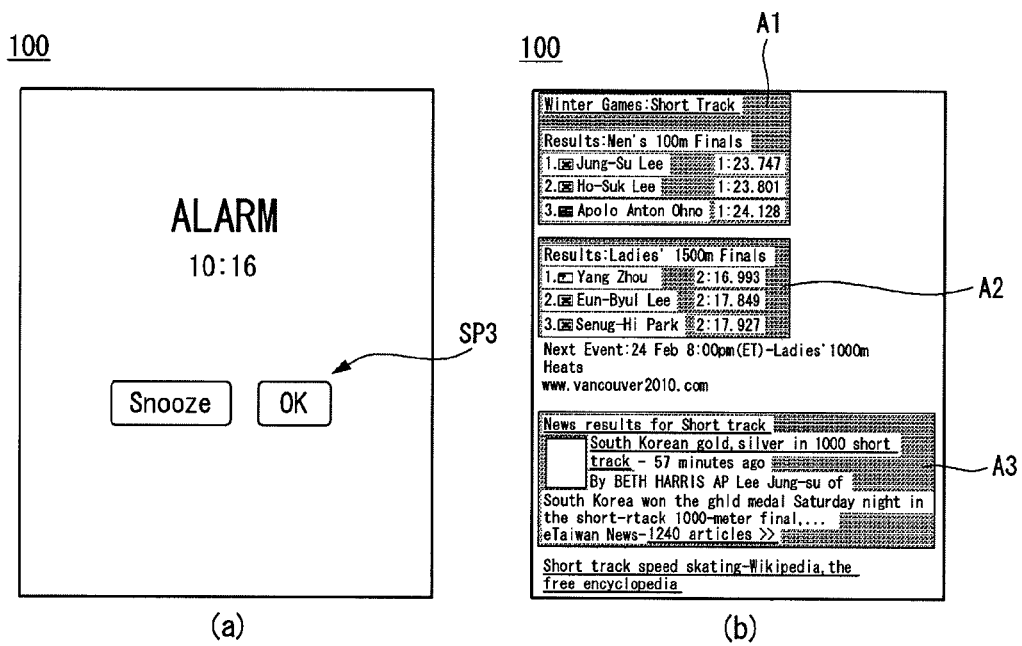
Figure 15:
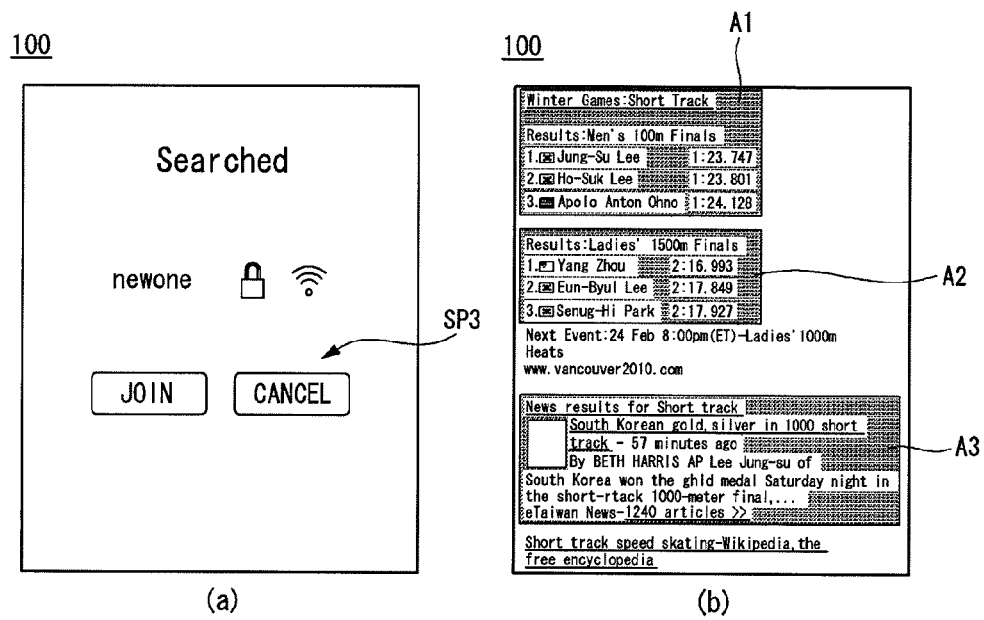

Then referring to FIG. 11(a), the first area A1 including the selected item is affixed to an e-mail since the e-mail function was selected in FIG. 10(d). Referring to FIG. 11(b), the user may complete the e-mail and select a SEND button to end the e-mail function by sending the e-mail. When the execution of the specific function with respect to the selected item is terminated or completed, the touch screen 100 returns to the initial state displaying the image for selecting items, as shown in FIG. 11 (c) or (d).

In the example of FIG. 11(c), the touch screen 100 may display the initial image on which only the second and third areas A2 and A3 are indicated as still selected. That is, the selection of the first area A1 on which the e-mail function has been executed is cancelled since the function has been already performed. When a specific function with respect to a specific item has been executed, there is a less possibility of re-executing the specific function on the specific item, and thus the selection of the area including the item may be cancelled in this example.

In another example, referring to FIG. 11(d), the touch screen 100 may display the initial image being displayed before the e-mail function is executed. That is, the selection of the first, second and third areas A1, A2 and A3 is all maintained irrespective of the execution of the e-mail function for the first area A1.

FIGS. 12(a)-13(b) illustrate another exemplary operation of the mobile terminal shown in FIG. 5. In this example, even when an alarm event (event triggered by the mobile terminal) is generated while items are being selected, the mobile terminal 10 shown in FIG. 5 can maintain the selection of the items even after the alarm event is ended. Accordingly, it is possible to mitigate the inconvenience that the user has to repeatedly select the same items.

Referring to FIG. 12(a), the user may select the first, second and third areas A1, A2 and A3 on the screen of the mobile terminal, e.g. using a touch action. To represent that the user selects the first, second and third areas A1, A2 and A3, hatching is made on the first, second and third areas A1, A2 and A3, but other indications or markers can be used to indicate that the areas A1, A2 and A3 have been selected.

Referring to FIGS. 12(b) and 12(c), an alarm (which may be set previously) may be displayed at a specific time. For instance, the controller 40 shown in FIG. 5 may judge whether the specific time previously set by the user corresponds to the current time and execute an alarm-related application at the specific time so as to inform the user of the specific time visually and audibly. The alarm-related application may include an independent application or a process capable of performing an alarm-related function.

When the alarm is displayed on the touch screen 100, alarm-related contents (e.g., window SP3 in FIG. 13(a)) may be displayed over the whole area of the touch screen 100, as shown in FIG. 12(b), or may be displayed on a specific part of the touch screen 100, as shown in FIG. 12(c). When the alarm-related contents are displayed on a specific part of the touch screen 100, the alarm-related contents may be displayed in the form of a second input window SP2. The display of the touch screen 100 may be changed according to the execution of the alarm-related application irrespective of whether the alarm-related contents are displayed over the whole area of the touch screen 100 or displayed on a specific part of the touch screen 100.

Referring to FIG. 13(a), when the entire area of the touch screen 100 displays the alarm-related contents, the user may select the input window SP3 while the alarm function is executed on the touch screen 100. As a variation, if the input window SP2 is used to display the alarm-related contents, then the input window SP2 may be selected by the user. The input window SP2 or SP3 may include a SNOOZE button for postponing the alarm and an OK button for stopping the alarm, either of which is selectable by the user.

Referring to FIG. 13(b), when the alarm-related application is inactivated, unloaded or ended (e.g., the user has selected the OK button in the window SP2 or SP3), the touch screen 100 re-displays the initial image previously displayed before the alarm-related contents were displayed. At this time, the items selected by the user before the alarm-related application was executed are maintained and displayed on the touch screen 100 as still being selected even after the alarm event has been processed.

FIGS. 14(a)-15(b) illustrate another exemplary operation of the mobile terminal shown in FIG. 5. In this example, even when an event of searching for an external electronic device and notifying the user that the external electronic device is searched is generated, the mobile terminal 10 shown in FIG. 5 can maintain the selection of the items even after the search event ends. Accordingly, it is possible to mitigate the inconvenience that the user has to repeatedly select the same items to perform various functions associated with the items.

Referring to FIG. 14(a), the user may select the first, second and third areas A1, A2 and A3 on the screen of the mobile terminal as explained above. To represent that the user has selected the first, second and third areas A1, A2 and A3, hatching may be performed on the first, second and third areas A1, A2 and A3, but other ways to indicate the selection can be used.

Referring to FIG. 14(b) or 14(c), the user may be informed that a specific terminal/network/service, which can be connected through a wireless Internet module or a local area communication module included in the wireless communication unit 20 shown in FIG. 5, is searched through a visual method. Here, information representing that the specific terminal/network/service is searched may be displayed over the whole area of the touch screen 100 (FIG. 14(b)) or on a specific part of the touch screen 100 (FIG. 14(c)). The specific terminal (or network or service) that can be connected with the wireless communication unit 20 shown in FIG. 5 may be searched according to a control signal of the controller 40 shown in FIG. 5 without having an input or involvement of the user. For example, when the wireless communication unit 20 shown in FIG. 5 receives an RF signal with a specific intensity at predetermined time intervals, the controller 40 shown in FIG. 5 may control the wireless Internet module or the local area communication module to search for a specific wireless terminal/network/service. When the specific wireless terminal/network/service is searched and found, the controller 40 shown in FIG. 5 may display an input window SP2 or SP3 (FIG. 14(c) or 15(a)) to inform the user that the specific wireless terminal/network/service is searched (and found), and connect the mobile terminal to the searched wireless terminal/network/service according to a user input.

Referring to FIG. 15(a), when the information on the searched wireless terminal/network/service is displayed on the touch screen 100, the user may perform a desired operation by using a JOIN button or a CANCEL button displayed in the input window SP3 (or SP2).

Referring to FIG. 15(b), after an application that informs the user that the specific wireless terminal/network/service is found/searched is unloaded, inactivated or terminated, the image being displayed before that application is executed is preferably re-displayed on the touch screen 100. Here, the selection of the first, second and third areas A1, A2 and A3 is maintained on the screen 100 as described above and the selected areas are still indicated as selected.

Figure 16:
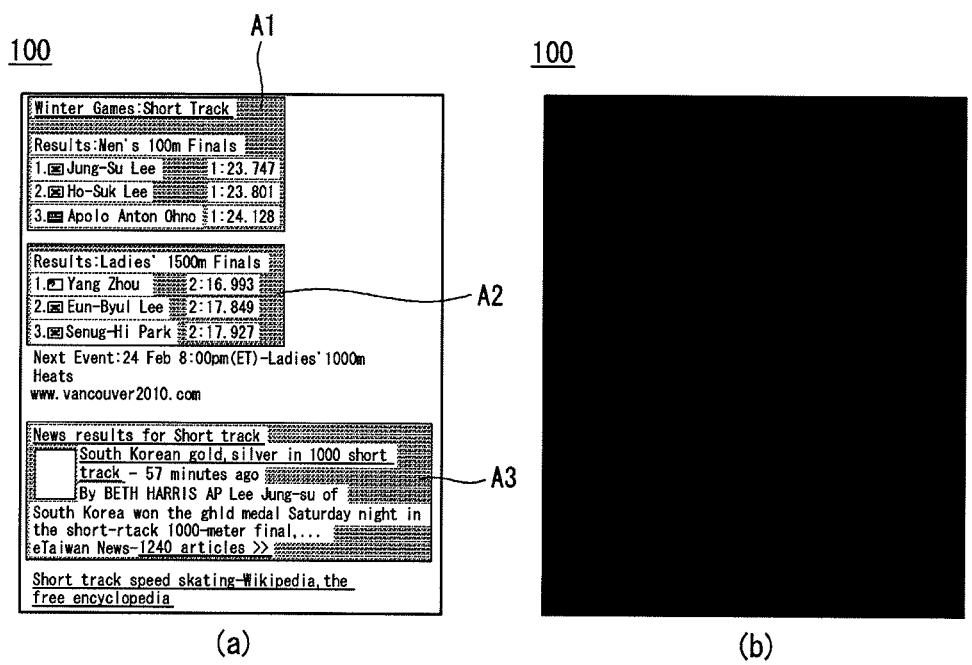
FIG. 16 illustrates another example of an operation of the mobile terminal shown in FIG. 5.

FIGS. 16(a)-16(b) illustrate another exemplary operation of the mobile terminal shown in FIG. 5. In this example, even when any input is not applied to the touch screen 100 for longer than a predetermined time and thus an event of converting the mobile terminal 10 shown in FIG. 5 into a sleep mode is generated, the mobile terminal 10 shown in FIG. 5 can maintain the selection of the items, even after the generated event is ended. Accordingly, it is possible to mitigate the inconvenience that the user has to repeatedly select the same items.

Referring to FIG. 16(a), the user may select a plurality of items, e.g., areas A1, A2 and A3, and such selection is indicated by the hatched lines on the screen 100.

Thereafter, referring to FIG. 16(b), when no input is applied to the touch screen 100 or the mobile terminal 10 shown in FIG. 5 for a predetermined time, then the mobile terminal 10 shown in FIG. 5 may automatically enter into a sleep mode, which is an event initiated by the mobile terminal. The conversion into the sleep mode may be performed in such a manner that a sleep mode-related application is executed. The sleep mode-related application may include an independent application and a process included in an application. When the mobile terminal 10 shown in FIG. 5 is converted into the sleep mode, the controller 40 shown in FIG. 5 may cut off the supply of power to the touch screen 100 to reduce the power consumption. As a result, the display state of the touch screen 100 may be changed to a black state as shown in FIG. 16(b).

Thereafter, the sleep mode may be ended according to a user input or a control signal of the controller 40 shown in FIG. 5. When the sleep mode ends, the image for selecting items, such as that shown in FIG. 16 (a), may be re-displayed. That is, the selection of the items that was made before the sleep mode is maintained and displayed as still selected, even after the sleep mode ends.

In the above examples, various events which are initiated by the mobile terminal itself (e.g., receiving a phone call, entering a sleep mode, etc.) are discussed. The invention is not limited to such examples, and the inventive features are equally applicable any event which is initiated by the mobile terminal, which causes the screen image to be changed.

According to embodiments of the invention, the selection of specific items can be maintained within the mobile terminal in various ways. The selection may be stored and then retrieved when the screen's image returns to the displaying of the selected items, or the image having the selected items may be stored and such image may be re-displayed after the function is completed. For instance, this can be provided by storing information on the selected items in a storage unit of the mobile terminal and then retrieving the same after the execution of the function(s) corresponding to the selected item(s). Then the same retrieved information or a modification as needed may be displayed on the screen. In another example, the initial page (or the item selected page) may be stored in the mobile terminal as a background page and after the execution of the applicable function(s), the background page may be re-displayed as the foreground page on the screen of the mobile terminal. The application/function associated with the selected item can also be switched from an inactive state to an active state to carry out the desired operation/function, and then can be switched back to the inactive state when the previously selected items are re-displayed as still be selected.

Although items are displayed in a single image on the touch screen 100 in the above implementations, items displayed over multiple images may be selected. For example, if there are ten web pages and the first page is currently displayed, the above-described operation can be performed even when items included in the first, fifth and tenth pages are selected.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. A method of controlling a mobile terminal including a display unit and a mobile communication unit, the method comprising:

displaying, on a screen of the display unit, an execution screen of a first application including a web page consisting of content comprising a plurality of text items and image items;

receiving a selection of a specific item among the plurality of the displayed items, the specific item representing a selected region of content in the web page;

indicating, on the execution screen of the first application, the specific item as selected to distinguish the specific item from unselected regions of content of the web page;

while the specific item is indicated as selected, when a telephone call request corresponding to a second application is received through the mobile communication unit:

executing the second application and changing the screen of the display unit from the execution screen of the first application to an execution screen of the second application without an input of a user, wherein the telephone call request is initiated by the mobile terminal without an input of the user a user and the specific item is not used by the second application; and after the execution of the second application is completed, re-displaying without the input of the user, on the screen, the execution screen of the first application having the specific item displayed as still selected;

while the specific item is indicated as selected, when an input of the user for the specific item is received:

executing a third application using the specific item based on the input of the user for the specific item and changing the screen of the display unit from the execution screen of the first application to an execution screen of the third application; and after the execution of the third application is completed, re-displaying without the input of the user, on the screen, the execution screen of the first application having the specific item displayed as unselected.

2. The method of claim 1, further comprising:

displaying a pop-up window identifying a plurality of functions including the third application based on the input of the user for the specific item, wherein the plurality of functions can be performed for the specific item, and vary according to one or more attributes of the specific item.

3. The method of claim 1, wherein each of the executing steps includes:
- loading a corresponding application to a memory of the mobile terminal, and
- converting the corresponding application from an inactive state to an active state or changing a background operation of the corresponding application to a foreground operation.

4. The method of claim 1, further comprising:
- receiving a selection of at least one item among the plurality of the displayed content items;
- linking a specific function to one of the at least one selected item;
- performing the linked function using the at least one selected item according to the user input; and
- after the linked function is performed, re-displaying the execution screen of the first application having:
  - the one item whose linked function has been performed as unselected and any other selected item without any linked function as still selected, or all of the at least one selected item as still selected.

5. The method of claim 4, wherein the linking step includes:
- displaying a pop-up window identifying one or more functions that can be performed for the one of the at least one selected item, and
- linking the specific function selected among the identified one or more functions through the pop-up window, to the one of the at least one selected item.

6. The method of claim 4, wherein the linked function includes at least one of the following:
- a function of copying contents of the at least one selected item,
- a function of affixing contents of the at least one selected item to an e-mail,
- a function of searching for data associated with the at least one selected item, and
- a function of translating contents associated with the at least one selected item.

7. A mobile terminal comprising:
- a mobile communication unit;
- a display unit including a screen; and
- a controller configured to control the display unit and the mobile communication unit, and configured to:
- display, on the screen, an execution screen of a first application including a web page consisting of content comprising a plurality of text items and image items;
- receive a selection of a specific item among the plurality of the displayed items, the specific item representing a selected region of content in the web page;
- indicate, on the execution screen of the first application, the specific item as selected to distinguish the specific item from unselected regions of web content;
- while the specific item is indicated as selected, when a telephone call request corresponding to a second application is received through the mobile communication unit:
  - execute the second application and change the screen of the display unit from the execution screen of the first application to an execution screen of the second application without an input of a user,
  - wherein the telephone call request is initiated by the mobile terminal without an input of the user and the specific item is not used by the second application; and
  - after the execution of the second application is completed, re-display without the input of the user, on the screen, the execution screen of the first application having the specific item displayed as still selected;
- while the specific item is indicated as selected, when an input of the user for the specific item is received:
  - execute a third application using the specific item based on the input of the user for the specific item and change the screen of the display unit from the execution screen of the first application to an execution screen of the third application; and
  - after the execution of the third application is completed, redisplay without the input of the user, on the screen, the execution screen of the first application having the specific item displayed as unselected.

8. The mobile terminal of claim 7, wherein the controller is further configured to:
- display a pop-up window identifying a plurality of functions including the third application based on the input of the user for the specific item,
- wherein the plurality of functions can be performed for the specific item, and vary according to one or more attributes of the specific item.

9. The mobile terminal of claim 7, wherein each executing by the controller includes:
- loading a corresponding application to a memory of the mobile terminal, and
- converting the corresponding application from an inactive state to an active state or changing a background operation of the corresponding application to a foreground operation.

10. The mobile terminal of claim 7, wherein the controller is further configured to:
- receive a selection of at least one item among the plurality of the displayed content items,
- link a specific function to one of the at least one selected item,
- perform the linked function using the at least one selected item according to the user input, and
- after the linked function is performed, re-display the execution screen of the first application having:
  - the one item whose linked function has been performed as unselected and any other selected item without any linked function as still selected or all of the at least one selected item, as still selected.

11. The mobile terminal of claim 10, wherein the linking of the specific function performed by the controller includes displaying a pop-up window identifying one or more functions that can be performed for the one of the at least one selected item, and linking the specific function selected among the identified one or more functions through the pop-up window, to the one of the at least one selected item.

12. The mobile terminal of claim 10, wherein the linked function includes at least one of the following:
- a function of copying contents of the at least one selected item,
- a function of affixing contents of the at least one selected item to an e-mail,
- a function of searching for data associated with the at least one selected item, and
- a function of translating contents associated with the at least one selected item.

13. A method of controlling a mobile terminal including a display unit and a mobile communication unit, the method comprising:
- displaying, on a screen of the display unit, an execution screen of a first application including a plurality of items web pane consisting of content comprising a plurality of text items and image items;

receiving a selection of a specific item among the plurality of the displayed items, the specific item representing a selected region of content in the web page;

indicating, on the execution screen of the first application, the specific item as selected to distinguish the specific item from unselected items of the plurality of items regions of web content;

while the specific item is indicated as selected, receiving, by the mobile communication unit, an interrupting event corresponding to a second application;

executing the second application and changing the screen of the display unit from the execution screen of the first application to an execution screen of the second application without an input of a user, wherein the interrupting event is initiated by the mobile terminal without an input of the user and the specific item is not used by the second application; and after the execution of the second application is completed, re-displaying without the input of the user, on the screen, the execution screen of the first application having the specific item displayed as still selected; and while the specific item is indicated as selected, when an input of the user for the specific item is received:
   executing a third application using the specific item based on the input of the user for the specific item and changing the screen of the display unit from the execution screen of the first application to an execution screen of the third application; and
   after the execution of the third application is completed, re-displaying without the input of the user, on the screen, the execution screen of the first application having the specific item displayed as unselected.

\* \* \* \* \*